(12) United States Patent
Kelly

(10) Patent No.: US 10,870,591 B2
(45) Date of Patent: Dec. 22, 2020

(54) WATER TREATMENT SYSTEM FOR REMOVING HEXAVALENT CHROMIUM

(71) Applicant: U.S. Water Services, Inc., St. Michael, MN (US)

(72) Inventor: Michael D. Kelly, Collierville, TN (US)

(73) Assignee: U.S. Water Services, Inc., St. Michael, MN (US)

( * ) Notice: Subject to any disclaimer, the term of this patent is extended or adjusted under 35 U.S.C. 154(b) by 104 days.

(21) Appl. No.: 16/407,495

(22) Filed: May 9, 2019

(65) Prior Publication Data

US 2019/0263682 A1    Aug. 29, 2019

Related U.S. Application Data

(62) Division of application No. 15/170,173, filed on Jun. 1, 2016, now Pat. No. 10,294,126.

(60) Provisional application No. 62/172,017, filed on Jun. 5, 2015.

(51) Int. Cl.
| | |
|---|---|
| *C02F 1/42* | (2006.01) |
| *C02F 1/70* | (2006.01) |
| *C02F 1/66* | (2006.01) |
| *C02F 101/22* | (2006.01) |
| *C02F 1/28* | (2006.01) |

(52) U.S. Cl.
CPC ............... *C02F 1/42* (2013.01); *C02F 1/285* (2013.01); *C02F 1/66* (2013.01); *C02F 1/70* (2013.01); *C02F 2001/422* (2013.01); *C02F 2101/22* (2013.01); *C02F 2303/16* (2013.01)

(58) Field of Classification Search
None
See application file for complete search history.

(56) References Cited

U.S. PATENT DOCUMENTS

| | | | |
|---|---|---|---|
| 3,223,620 A | 12/1965 | Oberhofer | |
| 5,770,090 A | 6/1998 | Lewis, III | |
| 2007/0114178 A1 | 5/2007 | Coppola | |
| 2010/0176059 A1* | 7/2010 | Gisch | C08F 8/44 |
| | | | 210/662 |

OTHER PUBLICATIONS

Hubicki et al, Selective Removal of Heavy Metal Ions from Waters and Waste Waters Using Ion Exchange Methods, Ion Exchange Technolgoies, Ayben Kilislioglu, IntechOpen, DOI:10.57772/51040. (Year: 2012).

(Continued)

*Primary Examiner* — Matthew O Savage
(74) *Attorney, Agent, or Firm* — Barnes & Thornburg LLP; Scott Rothenberger

(57) ABSTRACT

A method for removing chromium from a water source can include delivering source water having a hexavalent chromium oxyanion into contact with an ion exchange resin to exchange the hexavalent chromium oxyanion for an anion and convert the source water to treated water, discharging the treated water, rinsing the ion exchange resin with a brine solution to remove the hexavalent chromium oxyanion from the ion exchange resin, converting the hexavalent chromium oxyanion to a trivalent chromium cation, binding the trivalent chromium cation to a chelating resin, and removing the trivalent chromium cation bound to the chelating resin.

11 Claims, 2 Drawing Sheets

(56) References Cited

OTHER PUBLICATIONS

Response to Restriction Requirement dated Jul. 23, 2018, filed Nov. 12, 2018, in U.S. Appl. No. 15/170,173.
Requirement for Restriction/Election, dated Jul. 23, 2018, for U.S. Appl. No. 15/170,173, filed Jun. 1, 2016.

* cited by examiner

WATER TREATMENT SYSTEM FOR REMOVING HEXAVALENT CHROMIUM

CROSS REFERENCE TO RELATED APPLICATIONS

This application is a divisional of U.S. patent application Ser. No. 15/170,173, filed Jun. 1, 2016, entitled "WATER TREATMENT SYSTEM AND METHOD" and also claims priority to U.S. Provisional Patent Application No. 62/172,017, filed Jun. 5, 2015, entitled "WATER TREATMENT SYSTEM AND METHOD", the entire contents of which are incorporated herein by reference.

TECHNICAL FIELD

This disclosure relates to the treatment of water and, more specifically, to removal of chromium from water.

BACKGROUND

Chromium is a naturally occurring metal found in rock, soil, atmospheric gas, and biological organisms. Chromium is found in two predominant valence states: trivalent (Cr (III)) and hexavalent (Cr(VI)). The presence of chromium, particularly hexavalent chromium, in water sources is becoming an increasing health problem and an environmental problem with industrial wastewater effluent streams. Hexavalent chromium occurs in water sources as pH dependent oxyanion species. Typical oxyanion species include $HCrO_4^{-1}$, $CrO_4^{-2}$, and $Cr_2O_7^{-2}$. Existing methods of removing chromium from water produce a significant volume of waste residuals including, in some cases, hazardous waste.

SUMMARY

In general, this disclosure is directed to systems and methods for water treatment to remove chromium, such as hexavalent chromium, from water. In certain embodiments, hexavalent chromium oxyanions in source water are captured and converted to trivalent chromium cations which are in turn captured and discharged. Accordingly, embodiments of the disclosure are useful for creating treated water with lower levels of hexavalent chromium oxyanions.

In one embodiment, a method for removing chromium from a water source includes delivering source water having a hexavalent chromium oxyanion into contact with an ion exchange resin to exchange the hexavalent chromium oxyanion for an anion and convert the source water to treated water, discharging the treated water, rinsing the ion exchange resin with a brine solution to remove the hexavalent chromium oxyanion from the ion exchange resin, converting the hexavalent chromium oxyanion to a trivalent chromium cation, binding the trivalent chromium cation to a chelating resin, and removing the trivalent chromium cation bound to the chelating resin.

In another embodiment, a method for removing chromium from a water source includes delivering source water having a hexavalent chromium oxyanion into contact with an ion exchange resin to exchange the hexavalent chromium oxyanion for an anion and convert the source water to treated water, discharging the treated water, rinsing the ion exchange resin with a brine solution to remove the hexavalent chromium oxyanion from the ion exchange resin and regenerate the ion exchange resin, adjusting the pH of the brine solution prior to converting the hexavalent chromium oxyanion to a trivalent chromium cation, delivering the brine solution into contact with a reducing agent to convert the hexavalent chromium oxyanion to the trivalent chromium cation, delivering the brine solution into contact with a chelating resin to bind the trivalent chromium cation to the chelating resin, and removing the chelating resin with the trivalent chromium cation bound to the chelating resin.

In another embodiment, a system for removing chromium from a water source includes a first vessel containing an ion exchange resin. The first vessel is configured to receive source water and exchange a hexavalent chromium oxyanion for an anion and convert the source water to treated water, and is configured to receive a brine solution to remove the hexavalent chromium oxyanion from the ion exchange resin. The system also includes a second vessel for receiving the brine solution with the hexavalent chromium oxyanion from the first vessel, a third vessel containing a reducing agent for converting the hexavalent chromium oxyanion in the brine solution to a trivalent chromium cation, and a fourth vessel containing a chelating resin for binding the trivalent chromium cation in the brine solution. The fourth vessel is configured to discharge the trivalent chromium cation bound to the chelating resin.

The details of one or more examples are set forth in the accompanying drawings and the description below. Other features, objects, and advantages will be apparent from the description and drawings, and from the claims.

DETAILED DESCRIPTION

The following detailed description is exemplary in nature and is not intended to limit the scope, applicability, or configuration of the invention in any way. Rather, the following description provides some practical illustrations for implementing examples of the present invention. Examples of constructions, materials, dimensions, and manufacturing processes are provided for selected elements, and all other elements employ that which is known to those of ordinary skill in the field of the invention. Those skilled in the art will recognize that many of the noted examples have a variety of suitable alternatives.

Embodiments of the disclosure include methods and systems for removing chromium from a water source. An embodiment of a method in accordance with the disclosure includes reducing the level of hexavalent chromium oxyanions (e.g. $HCrO_4^{-1}$, $CrO_4^{-2}$, and $Cr_2O_7^{-2}$) in a water source by contacting the water source with an ion exchange resin.

Figure 1:
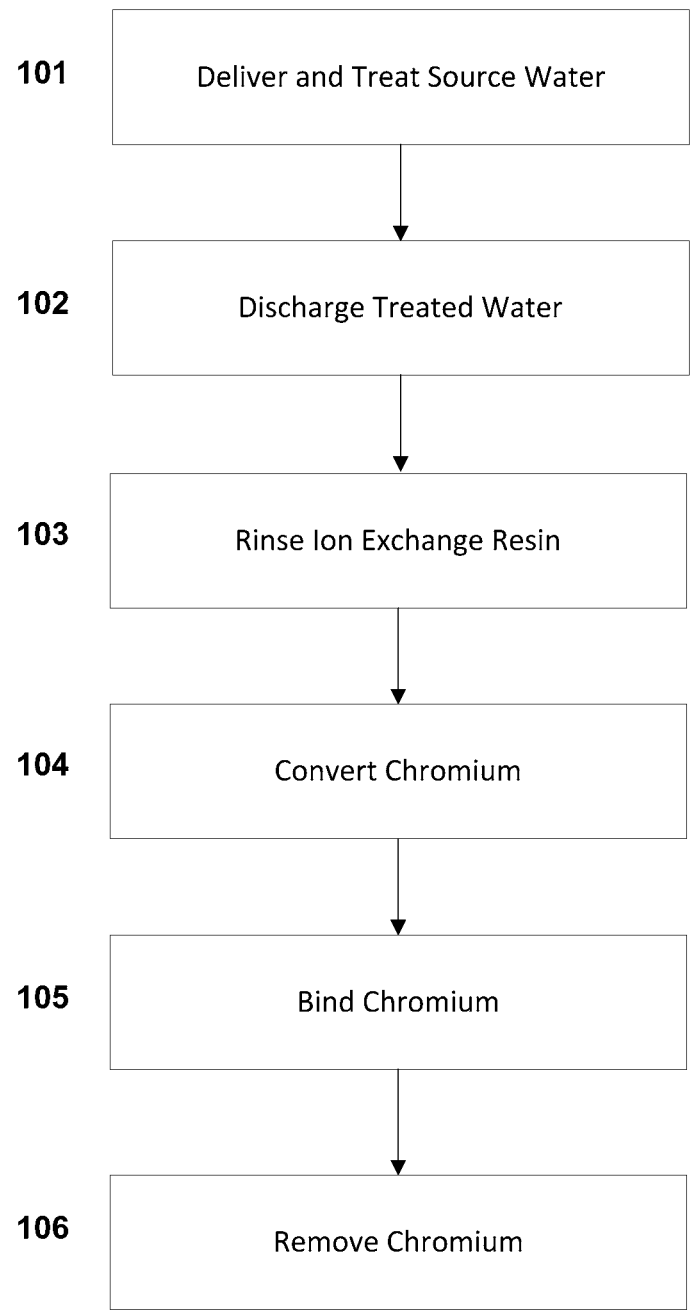
FIG. 1 is a flow diagram illustrating an exemplary method in accordance with an embodiment of the disclosure.

FIG. 1 is a flow diagram illustrating an exemplary method in accordance with an embodiment of the disclosure. As shown in FIG. 1, in certain embodiments, the method includes delivering source water having hexavalent chromium oxyanions into contact with an ion exchange resin in order to exchange the hexavalent chromium oxyanions with other anions and convert the source water to treated water (101). The method can also include discharging the treated water (102). In some embodiments, the treated water can be discharged for direct use in a downstream process or to a holding tank or sewer. The method can also include rinsing the ion exchange resin (103). In some embodiments, the ion exchange resin can be rinsed with a brine solution to remove the hexavalent chromium oxyanion from the ion exchange resin. The method can also include converting the hexavalent chromium oxyanions to trivalent chromium cations (104). In other embodiments, the method of FIG. 1 can also include binding the trivalent chromium cations to a chelating ion exchange resin (105) and removing the trivalent chromium cations bound to the chelating resin (106). Note the order of the steps shown in FIG. 1 is only exemplary, and steps may be performed in other orders or simultaneously.

In treating the source water (101), any ion exchange resin useful for capturing hexavalent chromium oxyanions and exchanging the hexavalent chromium oxyanions for another anion can be used. When source water is passed through an ion exchange resin, hexavalent chromium oxyanions in the source water are exchanged for the anions in the ion exchange resin. In some embodiments, the ion exchange resin is a basic anionic ion exchange resin, such as a strongly basic anionic exchange resin. In other embodiments, the resin can include a cross-linked co-polymer, for example, in the form of a plurality of beads. The cross-linked co-polymer can be selected from the group consisting of styrenic, acrylic, and phenolic polymers. Any functional group selective for hexavalent chromium oxyanions can be utilized. In some embodiments, the ion exchange resin can include a quaternary amine functional group, such as a quaternary amine functional group selected from the group consisting of di-methyl, tri-methyl, tri-ethyl, tri-propyl, and tri-butyl amine. In certain embodiments, the anion resin can be in a sulfate ($SO_4^{-2}$) or a chloride (Cl) form.

As more and more source water is passed through the ion exchange resin, the ion exchange resin eventually becomes "exhausted" where the resin cannot remove any more hexavalent chromium oxyanions. The exhausted resin can be regenerated by rinsing the resin with a brine solution. In rinsing the ion exchange resin (103), the brine solution can be used to remove the hexavalent chromium oxyanions from the ion exchange resin and regenerate the resin so that it can be used to treat additional source water. The brine solution can be passed through the resin bed containing the hexavalent chromium in a direct or counter flow direction, along with optional rinse water flushes. In some embodiments, the brine solution includes water and a salt, such as sodium sulfate, potassium sulfate, or magnesium sulfate. In certain embodiments, the brine solution includes water with a concentration of salt of at least 10% by weight (e.g., between 10% and 20% by weight). In certain embodiments, the brine solution delivered to the ion exchange resin is basic. For example, the brine solution may have a pH of between 10 and 12, and more preferably a pH of between 10.5 and 11.

In some embodiments, the pH of the brine solution carrying the hexavalent chromium oxyanion is adjusted prior to further treatment (e.g., prior to the conversion of the hexavalent chromium oxyanion to a trivalent chromium cation (104)). For example, the pH may be adjusted to be more acidic, preferably to a pH of between 2.0 and 4.0. In a specific example, the pH is adjusted to between 3.0 and 3.5. Having the pH at this level can be useful for keeping the trivalent chromium cation in solution after it is created by conversion from the hexavalent chromium oxyanion form. The pH of the brine solution can be adjusted by any method, such as by the addition of an acid (e.g., an acid selected from the group consisting of sulfuric acid and hydrochloric acid).

The hexavalent chromium oxyanions in the acidic brine solution can then be converted to the trivalent chromium cation form (104). In some embodiments, the brine solution carrying the hexavalent chromium oxyanions can be contacted with a reducing agent to convert the hexavalent chromium oxyanions to trivalent chromium cations. In certain embodiments, the reducing agent includes granular activated carbon (GAC). The hexavalent chromium oxyanions can be reduced by the GAC to trivalent chromium cations while a stoichiometric equivalent of carbon is oxidized to carbon dioxide, such as by the following representative chemical equation:

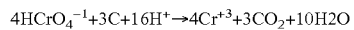

$$4HCrO_4^{-1} + 3C + 16H^+ \rightarrow 4Cr^{+3} + 3CO_2 + 10H_2O$$

The trivalent chromium oxyanion can then be bound to a chelating ion exchange resin (105), so that it can be removed from the system and discarded as waste. In some embodiments, the brine solution (e.g., acidic brine solution) carrying the trivalent chromium cations can be delivered into contact with a chelating ion exchange resin to bind the trivalent chromium cation to the chelating resin. The chelating resin can include any functional group useful for binding trivalent chromium, such as a functional group selected from the group consisting of iminodiacetic, aminophosphonate, thiouronium, and thiol. The trivalent chromium cations strongly bind to the chelating resin, due to the high selective capacity of the chelating resin over the sodium cation in the brine. The combination of the strong affinity for trivalent chromium cations and high loading capacity of the resin allows for the production of a low-volume of non-hazardous waste in a stable, bound form. This is advantageous, because existing methods of removing chromium from water can result in significant volumes of often hazardous waste.

In some embodiments, the method of FIG. 1 is a continuous process. In other embodiments, the method is a batch process. In certain embodiments, the method can be performed as a continuous process between batch process steps. For example, source water can be passed through the ion exchange resin until the resin reaches a load threshold of hexavalent chromium oxyanions. The source water flow can then be stopped, and the brine solution flow started to remove the hexavalent chromium oxyanions from the ion exchange resin and regenerate the resin. Upon hexavalent chromium removal and regeneration, the brine solution flow can be stopped and the source water flow restarted. In a specific embodiment, the process can be run in this manner until the chelating resin is fully bound to the trivalent chromium cation, at which point flow can be stopped and the chelating resin with the bound trivalent chromium cation is removed and replaced. Parallel systems and/or redundant subsystems can be utilized to provide a continuous process to deliver a continuous supply of treated water.

Accordingly, methods and systems in accordance with the present disclosure are useful for removing chromium, such as hexavalent chromium, from source water to create treated water with acceptable levels of chromium. In some embodiments, the treated water resulting from an embodiment of the method of FIG. 1 includes less than 10 micrograms per liter of hexavalent chromium (or a hexavalent chromium oxyanions thereof). In certain embodiments, the treated water includes less than 50 micrograms per liter of hexavalent chromium and trivalent chromium combined (or a hexavalent chromium oxyanions or trivalent chromium cations thereof).

Some embodiments of the method of FIG. 1 are also useful for passing other impurities in the source water through to the treated water, such that the impurities are not concentrated within the system. For example, in some embodiments, a substantial amount of any sulfates, nitrates, and arsenic in the source water is discharged with the treated water. In a specific example, more than 70% (e.g., more than 80%) of any sulfates, nitrates, and arsenic in the source water is discharged with the treated water.

Certain embodiments recycle various streams to further conserve process inputs and reduce liquid waste. For example, some embodiments recycle the brine solution to rinse the ion exchange bed after contact with the chelating resin. In certain embodiments, such as the embodiments where the pH of the brine solution has been adjusted to be more acidic, the pH of the brine solution may be adjusted to be more basic after the removal of the trivalent chromium. In a specific example, the pH is adjusted to between 10.5 and 12 (e.g. between 10.5 and 11). The pH of the brine solution can be adjusted by any method, such as by the addition of a base (e.g., a caustic soda such as sodium hydroxide).

In some embodiments, a portion of the brine solution (e.g., dilute brine solution) is diverted after contact with the ion exchange resin. Such diverted brine solution can be concentrated, such as by passing it through a system in which the brine is removed (e.g., a reverse osmosis system). The concentrated brine can be recombined with the brine solution stream in the system to be further processed as described herein, and the liquid can be discharged.

Figure 2:
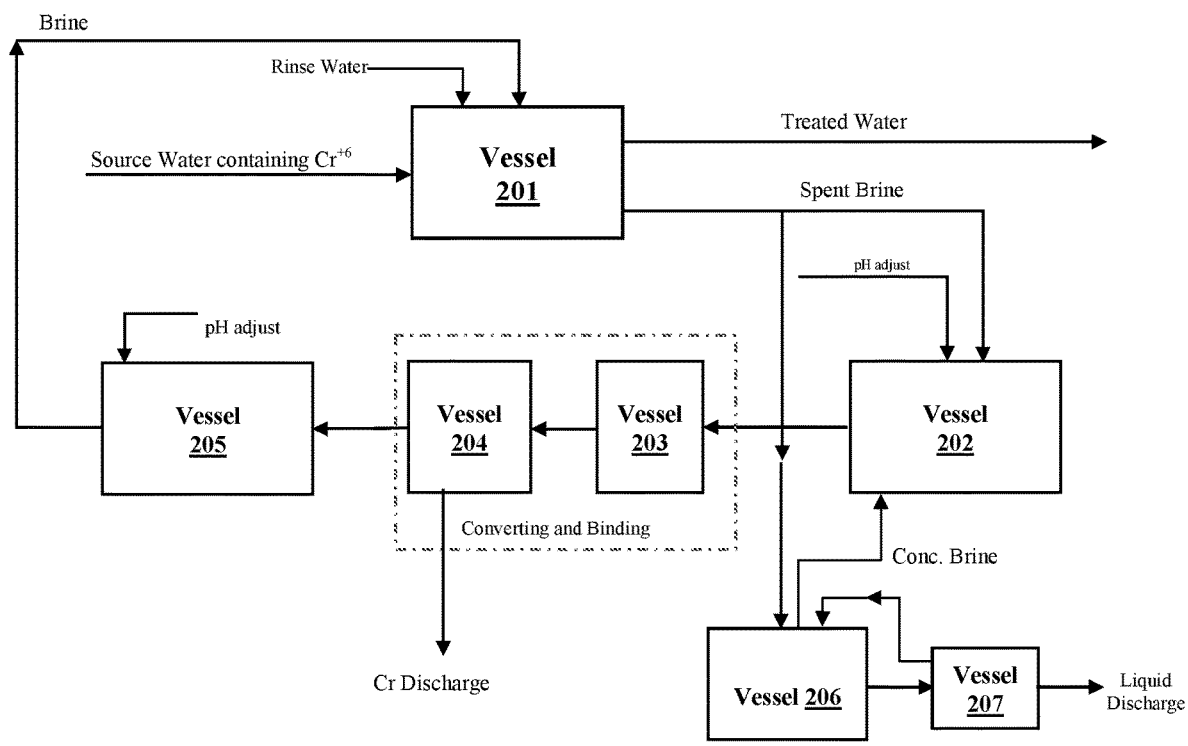
FIG. 2 is a schematic diagram illustrating an exemplary system in accordance with an embodiment of the disclosure.

FIG. 2 depicts an exemplary system in accordance with an embodiment of the disclosure. In the embodiment of FIG. 2, source water containing hexavalent chromium is delivered to a first vessel 201, which contains an ion exchange resin. The source water contacts the ion exchange resin in first vessel 201 to exchange the hexavalent chromium oxyanion for another anion and convert the source water to treated water. As shown in FIG. 2, treated water can be discharged from the first vessel 201. In the embodiment of FIG. 2, brine solution can also be delivered to the first vessel 201 to remove the hexavalent chromium oxyanions from the ion exchange resin and regenerate the resin. In some embodiments, rinse water can also be delivered to the first vessel 201 to assist in rinsing the ion exchange resin to regenerate the resin. In the embodiment shown, the spent brine solution can be delivered to a second vessel 202, where the pH of the spent brine solution can be adjusted. The spent brine solution can then be delivered to a third vessel 203 containing a reducing agent (e.g., GAC) to convert the hexavalent chromium oxyanions to trivalent chromium cations and on to a fourth vessel 204 containing a chelating resin to bind the trivalent chromium cations. The chelating resin with the bound trivalent chromium cations can be removed from the fourth vessel 204. In the embodiment of FIG. 2, the brine solution is delivered to a fifth vessel 205, where the pH of the brine solution can be adjusted before the brine solution is recycled back to the first vessel 201.

Also as shown in FIG. 2, a sixth vessel 206 and a seventh vessel 207 can be provided to collect a portion of the diluted brine solution stream and re-concentrate it. Diluted brine can be collected in the sixth vessel 206 and circulated through the seventh vessel 207. The seventh vessel 207 can include a system, such as a reverse osmosis system, to separate the brine elements from the clean liquid. The rejected brine can be recirculated to the sixth vessel 206 until the brine in the sixth vessel 206 is sufficiently concentrated (e.g., at least about 10%) to be delivered to the second vessel 202 to be further processed as discussed herein. The liquid permeate from the seventh vessel 207 can be discharged from the system.

Each of the vessels referred to herein can be any suitable size or form according to its function, and include columns, reaction tanks, and holding tanks as needed. Pipes, valves, and fittings can be used to provide fluid communication between the vessels. In some embodiments, parallel systems and/or subsystems can be utilized to provide for continuous source water treatment and treated water discharge.

Accordingly, some embodiments of the disclosure allow for the removal of chromium from source water. In certain embodiments discussed herein, such removal is accomplished without any chemical addition to the treated water discharged from the system. Further, embodiments including the recycled brine solution provide a significant reduction in liquid waste. In addition, embodiments of the disclosure provide for solid waste residuals that are relatively small in volume and have a non-hazardous classification.

Various examples have been described. These and other examples are within the scope of the following claims.

The invention claimed is:

1. A system comprising:
   a first vessel containing an ion exchange resin, the first vessel configured to receive source water and exchange an hexavalent chromium oxyanion for an anion and convert the source water to treated water, and configured to receive a brine solution to remove the hexavalent chromium oxyanion from the ion exchange resin;
   a second vessel for receiving the brine solution with the hexavalent chromium oxyanion from the first vessel;
   a third vessel containing a reducing agent for converting the hexavalent chromium oxyanion in the brine solution to a trivalent chromium cation; and
   a fourth vessel containing a chelating resin for binding the trivalent chromium cation in the brine solution, the fourth vessel configured to discharge the trivalent chromium cation bound to the chelating resin.

2. The system of claim 1, wherein the second vessel is configured to adjust the pH of the brine solution.

3. The system of claim 1, further comprising:
   a fifth vessel for receiving the brine solution from the fourth vessel, adjusting the pH of the brine solution, and recycling the brine solution to the first vessel.

4. The system of the claim 1, further comprising:
   a sixth vessel and a seventh vessel configured to re-concentrate the brine solution with the hexavalent chromium from the first vessel;
   wherein the sixth vessel is configured to receive the brine solution from the first vessel, cycle the brine solution through the seventh vessel, and deliver a concentrated brine solution to the second vessel; and
   wherein the seventh vessel contains a reverse osmosis system for producing the concentrated brine solution.

5. The system of claim 1, wherein the ion exchange resin is a basic anionic ion exchange resin.

6. The system of claim 1, wherein the ion exchange resin includes at least one of an acrylic, a styrenic, or a phenolic cross-linked co-polymer.

7. The system of claim 1, wherein the ion exchange resin includes a quaternary amine functional group.

8. The system of claim 1, wherein the anion is selected from the group consisting of a sulfate and a chloride.

9. The system of claim 1, wherein the brine solution includes a salt selected from the group consisting of sodium sulfate, potassium sulfate, and magnesium sulfate.

10. The system of claim 1, wherein the reducing agent includes a granular activated carbon.

11. The system of claim 1, wherein the chelating resin includes a functional group selected from the group consisting of iminodiacetic, aminophosphonate, thiouronium, and thiol.

\* \* \* \* \*